United States Patent
Archambault et al.

(10) Patent No.: US 8,423,979 B2
(45) Date of Patent: Apr. 16, 2013

(54) CODE GENERATION FOR COMPLEX ARITHMETIC REDUCTION FOR ARCHITECTURES LACKING CROSS DATA-PATH SUPPORT

(75) Inventors: Roch Georges Archambault, North York (CA); Alexandre E. Eichenberger, Chappaqua, NY (US); Amy Kai-Ting Wang, North York (CA); Peng Wu, Mt. Kisco, NY (US); Peng P. Zhao, North York (CA)

(73) Assignee: International Business Machines Corporation, Armonk, NY (US)

( * ) Notice: Subject to any disclaimer, the term of this patent is extended or adjusted under 35 U.S.C. 154(b) by 1930 days.

(21) Appl. No.: 11/548,851

(22) Filed: Oct. 12, 2006

(65) Prior Publication Data

US 2008/0092124 A1    Apr. 17, 2008

(51) Int. Cl.
*G06F 9/45*    (2006.01)

(52) U.S. Cl.
USPC ............................ 717/140; 717/149; 717/151

(58) Field of Classification Search ........................ None
See application file for complete search history.

(56) References Cited

U.S. PATENT DOCUMENTS

| | | | |
|---|---|---|---|
| 5,778,241 A | 7/1998 | Bindloss et al. | |
| 6,718,541 B2 * | 4/2004 | Ostanevich et al. | 717/149 |
| 7,926,046 B2 * | 4/2011 | Halambi et al. | 717/151 |
| 8,010,953 B2 * | 8/2011 | Gschwind | 717/149 |
| 8,037,462 B2 * | 10/2011 | Archambault et al. | 717/149 |
| 8,136,102 B2 * | 3/2012 | Papakipos et al. | 717/140 |
| 2004/0003381 A1 * | 1/2004 | Suzuki et al. | 717/150 |
| 2005/0240644 A1 | 10/2005 | Van Berkel et al. | |
| 2005/0283769 A1 * | 12/2005 | Eichenberger et al. | 717/151 |
| 2005/0283773 A1 * | 12/2005 | Eichenberger et al. | 717/151 |
| 2006/0015702 A1 | 1/2006 | Khan et al. | |
| 2007/0294681 A1 * | 12/2007 | Tuck et al. | 717/149 |
| 2008/0052689 A1 * | 2/2008 | Archambault et al. | 717/140 |
| 2008/0127146 A1 * | 5/2008 | Liao et al. | 717/150 |
| 2008/0178163 A1 * | 7/2008 | Gschwind et al. | 717/140 |

OTHER PUBLICATIONS

Lorenz et al. Optimized address assignment for DSPs with SIMD memory accesses, Proceedings of the 2001 Asia and South Pacific Design Automation Conference, 2001, pp. 415-420, Retrieved on [Nov. 21, 2012] Retrieved from the Internet: URL<http://dl.acm.org/citation.cfm?id=370430>.*

Suzuki et al. SIMD optimization in COINS compiler infrastructure, Innovative Architecture for Future Generation High-Performance Processors and Systems, Jan. 2005, Retrieved on [Nov. 21, 2012] Retrieved from the Internet: URL<http://ieeexplore.ieee.org/stamp/stamp.jsp?tp=&arnumber=1587834>.*

(Continued)

*Primary Examiner* — Thuy Dao
*Assistant Examiner* — Cheneca Smith
(74) *Attorney, Agent, or Firm* — Yee & Associates, P.C.; John D. Flynn

(57) ABSTRACT

A computer implemented method, apparatus, and computer usable program code for compiling source code for performing a complex operation followed by a complex reduction operation. A method is determined for generating executable code for performing the complex operation and the complex reduction operation. Executable code is generated for computing sub-products, reducing the sub-products to intermediate results, and summing the intermediate results to generate a final result in response to a determination that a reduced single instruction multiple data method is appropriate.

15 Claims, 5 Drawing Sheets

OTHER PUBLICATIONS

Mellott et al., "The Gauss Machine: A Galois-Enhanced Quadratic Residue Number System Systolic Array", 1993 IEEE, pp. 156-162.
Franchetti et al., "A SIMD Vectorizing Compiler for Digital Signal Processing Algorithms", Parallel and Distributed Processing Symposium., Proceedings International, IPDPS 2002, pp. 1-7.
Wu et al., "Efficient SIMD Code Generation for Runtime Alignment and Length Conversion", Proceedings of the International Symposium on Code Gneration and Optimization (CGO'05), 2005, pp. 1-12.

* cited by examiner

*FIG. 3*
*(PRIOR ART)*

| | | | |
|---|---|---|---|
| | | | |
| (X1 +I Y1) * (U1 + I V1) = (X1 U1 - Y1 V1) +I (X1 V1 + Y1 U1) | | | |
| | | | |
| X1 | Y1 | X2 | Y2 |
| * | | | |
| U1 | V1 | U2 | V2 |
| = | | | |
| X1U1−Y1V1 | X1V1+Y1U1 | X2U2−Y2V2 | X2V2+Y2U2 |
| | | | |
| | | | |
| Y1 | X1 | Y2 | X2 |
| | | | |
| U1 | U1 | U2 | U2 |
| | | | |
| V1 | V1 | V2 | V2 |
| | | | |
| X1 U1 | Y1 U1 | X2 U2 | Y2 U2 |
| | | | |
| Y1 V1 | X1 V1 | Y2 V2 | X2 V2 |
| | | | |
| X1 U1 | Y1 U1 | X2 U2 | Y2 U2 |
| "+(" | | | |
| -1 | 1 | -1 | 1 |
| * | | | |
| Y1 V1 | X1 V1 | Y2 V2 | X2 V2 |
| ")=" | | | |
| X1U1−Y1V1 | X1V1+Y1U1 | X2U2−Y2V2 | X2V2+Y2U2 |

| | ACTUAL NUMBER OF INSTRUCTIONS | | | ASYMPTOTIC: O(n) | | |
|---|---|---|---|---|---|---|
| | PERM | FMA/ADD | TOTAL | PERM | FMA/ADD | TOTAL |
| TRADITIONAL SCALAR | 0 | 4 n | 4 n | 0 | 4 n | 4 n |
| TRADITIONAL SIMD | 1 1/2n + 1 | 2 n | 3 1/2n + 2 | 1 1/2n | 2 n | 3 1/2n |
| OPTIMIZED SIMD | 1/2n + 3 | n + 2 | 1 1/2n + 5 | 1/2n | n | 1 1/2n |

FIG. 5

| | | | | |
|---|---|---|---|---|
| X1 | Y1 | X2 | Y2 | 502 |
| U1 | V1 | U2 | V2 | 504 |
| X1 U1 | Y1V1 | X2 U2 | Y2 V2 | 506 |
| V1 | U1 | V2 | U2 | 508 |
| X1 V1 | Y1U1 | X2 V2 | Y2 U2 | 510 |
| X3 | Y3 | X4 | Y4 | 512 |
| U3 | V3 | U4 | V4 | 514 |
| X1U1+X3U3 | Y1V1+Y3V3 | X2U2+X4U4 | Y2V2+Y4V4 | 516 |
| V3 | U3 | V4 | U4 | 518 |
| X1V1+X3V3 | Y1U1+Y3U3 | X2V2+X4V4 | Y2U2+Y4U4 | 520 |
| X1U1+X3U3 | X1V1+X3V3 | X2U2+X4U4 | X2V2+X4V4 | 522 |
| Y1V1+Y3V3 | Y1U1+Y3U3 | Y2V2+Y4V4 | Y2U2+Y4U4 | 524 |
| X1U1-Y1V1+X3U3-Y3V3 | X1V1+Y1U1+X3V3+Y3U3 | X2U2-Y2V2+X4U4-Y4V4 | X2V2+Y2U2+X4V4+Y4U4 | 526 |
| X2U2-Y2V2+X4U4-Y4V4 | X2V2+Y2U2+X4V4+Y4U4 | | | 528 |
| X1U1-Y1V1+X3U3-Y3V3+X2U2-Y2V2+X4U4-Y4V4 | X1V1+Y1U1+X3V3+Y3U3+X2V2+Y2U2+X4V4+Y4U4 | | | 530 |

US 8,423,979 B2

CODE GENERATION FOR COMPLEX ARITHMETIC REDUCTION FOR ARCHITECTURES LACKING CROSS DATA-PATH SUPPORT

BACKGROUND OF THE INVENTION

1. Field of the Invention

The present invention relates generally to an improved data processing system and in particular, to a method and apparatus for generating code. Still more particularly, the present invention relates to a computer implemented method, apparatus, and computer usable program code for automatic code generation for complex arithmetic reduction for architectures lacking cross data-path support.

2. Description of the Related Art

Data processing systems are increasingly used for complex mathematical operations. Complex mathematical operations involve the use of imaginary numbers. In mathematics, an imaginary number is a complex number whose square is a negative real number. Any complex number can be written as "a+bj" where "a" and "b" are real numbers and "j" or alternatively "i" is the imaginary unit, which is equal to the square root of −1. The number "a" is the real part of the complex number, and "b", is the imaginary part.

Imaginary numbers can be used in a variety of concrete or real-world applications in the field of science and other related technical areas, such as signal processing, dynamics, applied mathematics, control theory, electromagnetism, quantum mechanics, and cartography. For example, electrical engineers can express electrical voltage values and alternating current values using imaginary or complex numbers, which are referred to as phasors. Although phasors are values expressed in imaginary numbers, phasors represent real voltages that can cause damage to both people and equipment, even if their values contain no "real part".

In computing, single instruction multiple data (SIMD) is a technique employed to achieve data level parallelism, as in a vector or array processor. First popularized in large-scale supercomputers, smaller-scale single issue multiple data operations have now become widespread in personal computer hardware. Today, the term is associated almost entirely with these smaller units.

For machines with single issue multiple data units without cross data-path support, such as VMX or synergistic processing units (SPU), data involved in the operations must be reorganized or simdized to create multiple operations that achieve the purpose of the original complex multiply or complex divide. Reorganizing the data is expensive in terms of operations, processing power, memory, and time.

VMX is a floating point and integer single issue multiple data instruction set architecture (ISA) extension to the Power Architecture. Synergistic processing units are part of processor architectures, such as the Cell Broadband Engine™. Cell Broadband Engine, Cell B.E., and Cell are trademarks of the Sony Corporation and/or the Sony Computer Entertainment, Inc., in the United States, other countries, or both and are used under license therefrom.

Both the VMX and the SPE have 16 byte wide single issue multiple data units that are capable of processing 16 chars, 8 shorts, 4 single precision floating points, or 4 integers per single issue multiple data instruction. The synergistic processing unit is also capable of processing 2 double precision floating points per single issue data instruction.

As a result, simdizing operations, such as complex multiply for such SIMD units without cross data-path support typically does not yield performance improvement over the performance of scalar code for most machines. This is the case because typical single instruction multiple data hardware multiplies that are aligned in memory require so many data shuffles to align the data that performing the reorganization often exceeds the benefits of simdization.

BRIEF SUMMARY OF THE INVENTION

The illustrative embodiments provide a computer implemented method, apparatus, and computer usable program code for compiling source code for performing a complex operation followed by a complex reduction operation. A method is determined for generating executable code for performing the complex operation and the complex reduction operation. Executable code is generated for computing sub-products, reducing the sub-products to intermediate results, and summing the intermediate results to generate a final result in response to a determination that a reduced single instruction multiple data method is appropriate.

BRIEF DESCRIPTION OF THE SEVERAL VIEWS OF THE DRAWINGS

The novel features believed characteristic of the illustrative embodiments are set forth in the appended claims. The illustrative embodiments, themselves, however, as well as a preferred mode of use, further objectives, and advantages thereof, will best be understood by reference to the following detailed description of an illustrative embodiment when read in conjunction with the accompanying drawings, wherein:

FIG. 3 is a prior art example of a complex operation and the corresponding register values to assist in providing a clear understanding of the simdization process in accordance with the illustrative embodiments;

FIG. 5 is an example of a complex operation and the corresponding register values in accordance with an illustrative embodiment;

DETAILED DESCRIPTION OF THE INVENTION

Figure 1:
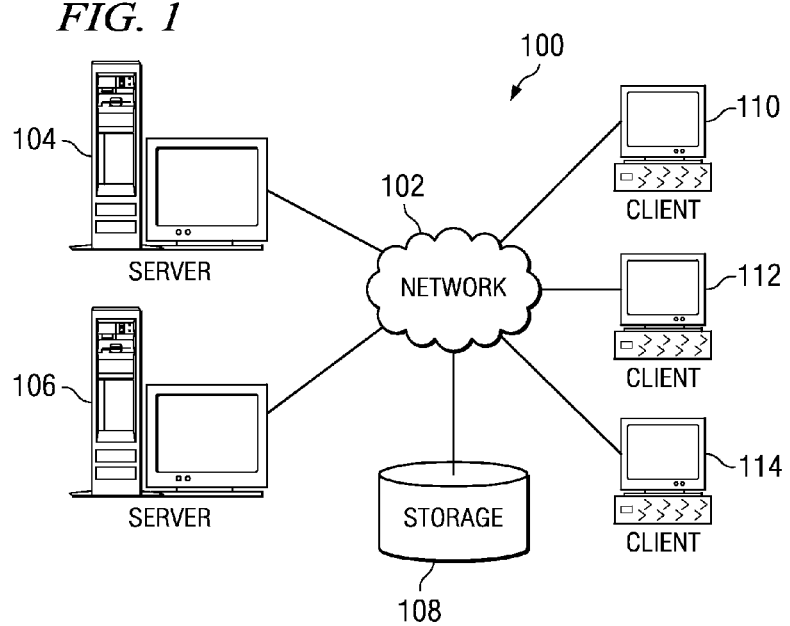
FIG. 1 is a pictorial representation of a data processing system in which the illustrative embodiments may be implemented.
Figure 2:
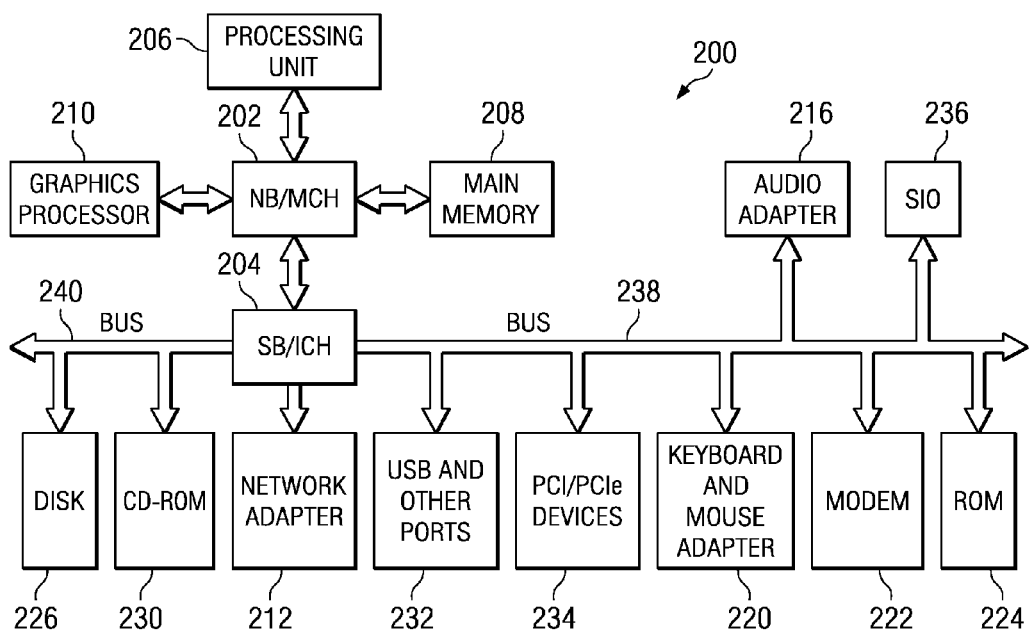
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for automatic code generation for complex arithmetic reduction for architectures lacking cross data-path support. Modern processors are using Single Issue Multiple Data (SIMD) units with greater frequency in order to significantly increase processing power without having to significantly increase issue bandwidth. The illustrative embodiments allow a compiler to automatically generate single issue multiple data code for processing complex operations, referred to hereinafter as "simdization", for a wide range of applications.

The single issue multiple data process is a set of operations that enables efficient handling of large quantities of data in parallel. The illustrative embodiments provide an improved simdization of complex reductions that reduces significantly the number of operations required to perform complex operations. Complex operations are mathematical operations that involve the use of imaginary numbers. The process determines whether it is more efficient to use the optimized single issue multiple data version or the scalar optimized version of a complex reduction based on a given scalar/single issue multiple data architecture and then generates the appropriate code. The compiler applies a transformation to simdize the class of operations using a precise resource model and costs of approach to determine when the transformation should be applied.

FIG. 3 is a prior art example of a complex operation and the corresponding register values to assist in providing a clear understanding of the simdization process in accordance with the illustrative embodiments. Cross data-path support is a hardware configuration well suited for complex operations. In one example, a cross data-path hardware configuration includes a full cross bar for allowing data to go to different sub-units of a SIMD unit. The following is an example for performing complex operations in a data processing system that does not support cross data-path.

In this example, registers are 16-byte wide single issue multiple data units. As shown, the memory locations or registers are divided into 16-byte single issue multiple data units separated into four fields or slots. A problem that is encountered in connection with simdization relates to data alignment in that data does not properly align with system hardware. Current procedures for effecting data alignment tend to be rather complex and to require significant processing.

Complex multiplications and divisions include alignment patterns that do not easily map into single issue multiple data hardware. Consider, for example, the following complex multiply 302:

$$(X1+iY1)*(U1+iV1)=(X1U1-Y1V1)+i(X1V1+Y1U1)$$

Single issue multiple data computation is difficult because of the importance of the layout of the data in memory/registers. In this example, each register includes four slots or fields for storing the data in the register. This alignment constraint allows only the addition/multiplication of numbers in vector registers that have the same slot number. For example, values to be multiplied must reside in the same byte offset in their respective vector registers.

Given this alignment constraint, consider two floating complex multiplications including complex multiplication 302 in registers 304 and 306 to generate register 308. Because single issue multiple data units can typically only multiply/add/subtract numbers that are in the same slot, such as slot 310 of register 304 and slot 311 of register 306, the data in registers 304 and 306 must first be prepared. The minimum number of data reorganizations to compute a single complex multiply given this input data layout on a single issue multiple data architecture without cross data-path support is three in this case. For example, the single issue multiple data architectures may be VMX or SPU as previously described.

One copy of register 304 is kept in an unaltered form as the other data is reordered in different steps using three permutes. First, the X's and Y's from register 304 are swapped in register 312. Next, the U's from register 306 are replicated to form register 314. The V's from register 306 are also replicated to form register 316.

Register 304 and register 314 are multiplied to get the data of register 318. Register 312 and register 316 are multiplied to get the data of register 320. Registers 318 and 320 are added and subtracted to get the final results of register 308. However, single issue multiple data operation on units such as VMX or SPU must be homogenous, such as either adds or subtracts. As a result, the first and third value of register 320 are changed. Assuming floating numbers, a fused multiply add is used to perform both a multiplication of register 320 by scalar 322 and is then added to register 318 to obtain register 308.

A description of the complex multiply process of FIG. 3 is as follows:

1. XY input in register 304, UV input in register 306
2. Register 312=permute of register 304 so that X and Y are swapped
3. Register 314=permute of register 306 so that Us are replicated
4. Register 316=permute of register 306 so that Vs are replicated
5. Register 318=register 304*register 314
6. Register 320=register 312*register 316
7. Register 308=register 318+register 322* register 320

The results are in slots 326 and 328 of register 308.

In FIG. 3, the minimum three permutes are used plus two multiplications and one fused-multiply-add, for a total of six operations for two complex multiply results. Contrast this result to a scalar version of a complex multiply which can be generated using one multiply, two Fused Multiply Add (FMA), and one fused-multiply-subtract per complex multiply, for a total of eight operations for two complex multiply results. The single issue multiple data computation is only slightly more efficient than the scalar computation.

This single issue multiple data advantage would be negated if the fused multiply add throughput on the scalar side is higher than the combined permute and fused multiply add bandwidth on the single issue multiple data side. It would also be negated if the latencies on the scalar side are smaller than on the single issue multiple data side. The advantage would also be negated if the compiler could not determine the alignment of the input data at compile time, as the compiler would have to introduce further load and permute instructions to align the input data at runtime in the vector registers of the single issue multiple data units. The relative poor performance of the single issue multiple data complex multiply is due to the fact that half of the single issue multiple data instructions are handling alignment related processing instead of floating point computations.

As a result, due to the small potential speedup of the single issue multiple data version of the code, and due to the long list of potential issues with the single issue multiple data version of the code, typical compilers do not attempt to simdize such complex multiply operations on single issue multiple data units without dedicated cross data-path support.

Figures 4, 6:
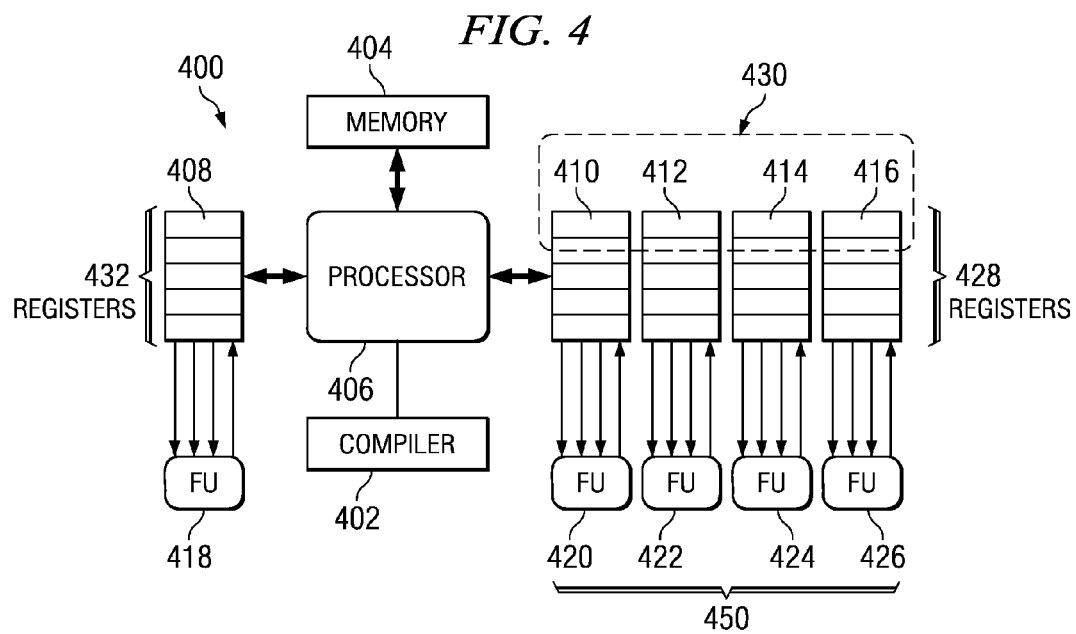
FIG. 4 is a block diagram illustrating data processing of a single issue multiple data processor in accordance with the illustrative embodiments.
FIG. 6 is an instruction calculation table in accordance with an illustrative embodiment.

FIG. 4 is a block diagram illustrating data processing of a single issue multiple data processor in accordance with the illustrative embodiments. Processing system 400 may be a computing system, such as data processing system 200 of FIG. 2. Processing system 400 is used to generate code for completing complex computations. Processing system 400 lacks cross data-path support. Compiler 402 uses code generated by processing system 400 to complete the complex computations. Processing system 400 includes various components including memory 404, processor 406, registers 408, 410, 412, 414, and 416, functional units (FU) 418, 420, 422, 424, and 426, vector register file 428, vector register 430, register file 432, and group 450. For purposes of FIG. 4 a register is a single row in a register file, a register is one instance of storage, and the register file is the set of registers of a unique type.

Compiler 402 is a computer program that translates text written in a computer or source language into another computer or target language. In the illustrative embodiments, complex operations are converted into instructions that may be executed by processing system 400 even though processing system 400 lacks cross data-path support. The processor may be processing unit 206, and the memory may be main memory 208 of FIG. 2. Registers 408, 410, 412, 414, and 416 may be used to store data values used for processing a complex operation.

Functional units 418, 420, 422, 424, and 426 are used to compute results, for example, single precision floating point results. As illustrated in FIG. 4, functional unit 418 computes scalar results. For example, functional unit 418 may load up to three values from the register file 432, for example reading from register 408, and produce one result that is written back in that same register file 432. On the other hand, group 450 of functional units 420, 422, 424, and 426 is a typical illustration of a single issue multiple data functional unit without cross data-path support.

Consider the processing of four single precision floating point numbers on a 16 byte wide single issue multiple data unit. In this example, each of the 16 byte registers in vector register file 428 holds four values. Within register file 428, a particular vector register is depicted as a single row. For example, vector register 430 consists of the first row in register file 428, and vector register 430 includes the four values of registers 410, 412, 414, and 416 in this example. Single issue multiple data functional units of group 450 may read up to three vector registers and produce one output that it may store in vector register file 428. As depicted in FIG. 4, each of functional units 420, 422, 424, and 426, which individually represent a single precision floating point and sub-units within group 450, may only process data that is directly above itself. Namely, there is no cross data-path support. For example, functional unit 420 can read or write a value in register 410 but never a value in register 412. Only one operation is allowed to look at all values within vector registers, and this operation is the permute operation. In VMX, it is referred to as "permute" instruction, and in SPU, it is referred as "shuffle byte" instruction. Both instructions work in basically the same way. Namely, the operations read two input vector registers and generate an output that corresponds to any permutation of the inputs at a byte granularity. The configuration of FIG. 4 is shown as an example. In other examples, the functional unit may process more than four sub-results and take data from multiple register files.

In the illustrative embodiments, the process uses the concept of sub-products for the complex operation. Sub-products are the initial distributive expansion of the complex operation. For example, the sub-products may be the results of expanding using double distributive property method or the first outer inner last (FOIL) expansion rule. The sub-products are summed to form intermediate results. For example, in a complex multiply, each of the four sub-products are summed to form intermediate results. The intermediate results or four sums of each sub-product, in this example, are added to compute the final result. As a result, fewer operations are required to perform complex operations, such as the process of FIG. 3 in which the results of the complex multiply are summed. For example, given the complex operation in which the result=$\text{Sum}_{j=1\ldots n}(x_j+iy_j)*(u_j+iv_j)$ the process computes intermediate results t1, t2, t3, and t4 in which t1=$\text{Sum}_{i=1\ldots n} x_j u_j$, t2=$\text{Sum}_{i=1\ldots n} x_j v_j$, t3=$\text{Sum}_{i=1\ldots n} y_j u_j$, and t4=$\text{Sum}_{i=1\ldots n} y_j v_j$. The final result is reconstituted from t1 . . . t4, once the loop over "j" is completed. The process is applicable to complex operations to add, subtract, multiply, divide, and any other operation combination.

FIG. 5 is an example of a complex operation and the corresponding register values in accordance with an illustrative embodiment. The example of FIG. 5 provides a reduction of the n complex multiply. Namely, the computation requires n complex multiplications, whose results are then summed together to form a single final complex number. Instead of computing the product with the minimum number of permutes as shown in FIG. 3, the sub-results of each complex multiply, such as XjUj, XjVj, YjUj, YjVj are calculated, and the sub-results are reduced. The sub-results are reduced by summing all "j" values. Only as a final step is the final complex number regenerated.

The illustrative embodiments may be applied to single issue multiple data units of arbitrary width. First, register 502 and register 504 are multiplied to obtain the result of register 506. Permuting the U's and V's from register 504 yields register 508. Register 502 and register 508 are multiplied to obtain register 510.

Registers 506 and 510 maintain the four sub-results of the complex multiply at a cost of one permute and two multiply operations. Additionally, when proceeding with the next two elements, an additional permute operation and two fused multiply add operations are used to jointly compute the multiplication plus adding the result to the previous partial sum.

Particularly, registers 512 and 514 are multiplied and added to register 506 to get register 516. Permuting the U's and V's from register 514 yields register 518. Multiplying register 512 and register 518 and adding register 510 yields register 520.

Note that in this description, registers 506 and 516 represent the same register at different points in time at which the register contains different values. Likewise, registers 510 and 520 represent the same register at different points in time at which the register contains different values. By using the fused multiply adds, the four sub-results of the complex multiply are computed and reduced. Namely, in this example, registers 516 and 520 included the accumulated sub-results of the first two single issue multiple data complex multiply.

When all complex multiply have been processed, the terms are reordered and added as appropriate. Assuming n=4, registers 516 and 520 are the final sub-results. Putting the first fields of registers 516 and 520 into the first and second slot results in register 522. Similarly, taking the second slots of registers 516 and 520 results in register 524. Multiplying register 524 by (−1.0, 1.0, −1.0, 1.0) and adding the result to register 522 yields register 526. To reduce to a single value requires one more permute and add for the end or final result.

A description of the process of FIG. 5 in accordance with an illustrative embodiment is as follows:
1. XY input in register 502, UV input in register 504
2. Register 508=permute the U's and V's from register 504
3. Register 506=register 502*register 504
4. Register 510=register 502*register 508 loop (n/2−1 times)
5. XY in register 512 and UV in register 514
6. Register 518=permute the U's and V's from register 514
7. Register 516=register 506+register 512*register
8. Register 520=register 510+register 512*register after loop:
9. Register 522=keep the two even fields from register 516 and register 520
10. Register 524=keep the two odd fields from register 516 and register 520
11. Register 526=register 522+(−1.0, 1.0, −1.0, 1.0)*register 524
12. Register 528=shift the right complex of register 526 to the left slot
13. Register 530=register 526+register 528

The final result is in left slot of register 530. In this description, registers 506 and 516 represent the same register at different points in time at which the register contains different values. Likewise, registers 510 and 520 represent the same register at different points in time at which the register contains different values.

In addition, the variable n can be any value selected by a user. Values of n that are even numbers or multiples of two are generally assumed to provide the best results. In the example shown above, the selected value of n is 4. However, if the selected value of n is not an even number, one solution would be to extend the arrays of complex numbers by one (0, 0) complex number or use other known techniques.

To summarize, the process in FIG. 5 described above requires ½n+3 PERM, n+1 fused multiply adds and 1 ADD. A "permute(register 502, register 504, mask)" like operation where the mask 00, 01, . . . 07, indicates when to take the first, second, . . . eighth float value of the eight values obtained by concatenating the values of register 502 and register 504. The result "register 522=keep the two even fields from register 506 and register 510" as "permute(register 506, and register 510, (0 2, 4, 6))." Similarly, "keep the two odd fields from register 506 and register 510", is "permute(register 506, register 510, (1, 3, 5, 7))." Furthermore, "permute the XY from register 512" is "permute(register 512, *, (1,0,3,2))".

FIG. 6 is an instruction calculation table in accordance with an illustrative embodiment. Instruction calculation table 600 is a resource model for determining when to use a transformation to simdize a class of operations. Instruction calculation table 600 may be used by compiler 402 of FIG. 4 to determine the approach that should be taken for processing a class of complex operations. The content of instruction calculation table 600 varies based on the complex operation being performed.

Instruction calculation table 600 describes how many operations are required for different architectures including traditional scalar 602, traditional SIMD 604, and optimized SIMD 606. Optimized SIMD 606 is the method of the present invention described in the illustrative embodiments. Traditional scalar 602 and traditional SIMD 604 are currently used methods. In accordance with the illustrative embodiments of the present invention, some complex multiply operations may require utilization of optimized SIMD 606 in conjunction with traditional scalar 602 and/or traditional SIMD 604, and there are also situations in which optimized SIMD 606 alone is used.

Instruction calculation table 600 describes both actual number of instructions 608 and asymptotic number of instructions 610. For example, in FIG. 6, when n is very large, the constant terms have almost no effect so only the values multiplied by n are kept. Columns within each of these categories describe the number of permutes, fused multiply add/ ADDs, and total instructions. Instruction calculation table 600 may be used by a compiler to generate the best possible code based on the costs and benefits of each of the respective approaches. The costs for traditional scalar, 602, traditional SIMD 604, or optimized SIMD 606 are shown in instruction calculation table 600.

The costs illustrated in table 600 are exemplary costs for performing complex multiply operations on a given data processing system. The costs illustrated in table 600 could vary where other complex operations are performed. The costs illustrated in table 600 could also vary depending upon the hardware and software utilized to implement optimized SIMD 606. For example, if a different algorithm is utilized to perform a reduction of division operation, the costs would be different from those illustrated in FIG. 6.

The optimized SIMD method of the illustrative embodiments reduces the asymptotic number of permutations from 1.5 to 0.5 per complex operation, the number of FMA/ADDs from 2 to 1 per complex operation, and the total number of instructions from 3.5 to 1.5 per complex operation, as compared with traditional single instruction multiple data approaches. The compiler approach analyzes for a given architecture implementation which approach is cheaper as shown in instruction calculation table 600. For example, given that a specific architecture has two scalar FMA for each single instruction multiple data FMA, the "n" for which there is equilibrium is determined as:

Total of Traditional Scalar($n$)/2=Total of optimized SIMD($n$)

$4n/2=1.5n+5$ $n=10$

For a machine with the specific architecture, any complex multiply reduction would be faster on scalar units when n<10 and faster on single instruction multiple data units for n>10. The compiler considers the target machine and resource bottlenecks as well as the number of iterations for determining which code generation approach is most effective.

Figure 7:
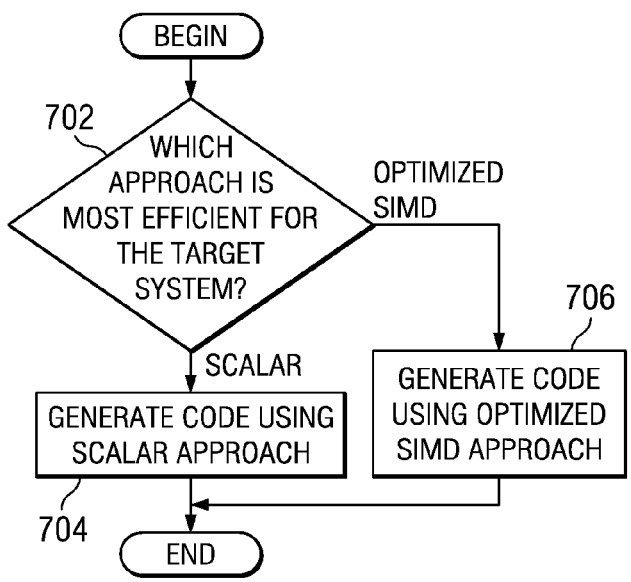
FIG. 7 is a flowchart for a process for generating code for a complex reduction operation in accordance with an illustrative embodiment.

FIG. 7 is a flowchart for a process for generating code for a complex reduction operation in accordance with an illustrative embodiment. A complex reduction operation is an operation that takes as input two vectors of n complex numbers and produces a single output complex number, such as the reduced complex number of register 530 of FIG. 5. The process in FIG. 7 may be performed by a compiler in a processor system, such as compiler 402 in processor system 400 in FIG. 4. The process first determines which approach is most efficient for the target system (step 702). The determination is made based on a table, such as instruction calculation table 600 of FIG. 6. The table is used to determine how many operations will be required by the target system. Each table used is specific for the complex reduction operation that is being optimized. The decision as to which instruction generation method will be used is made based on the expected number of instructions for the target system. Various other inputs, information, or processes may be used in addition to the table. For example, the compiler may use information on whether the alignment of the data is known at compile time or runtime, or any other performance aspect that may impact the generation of scalar and single issue multiple data code.

If the process determines that an optimized single issue multiple data approach is most effective, the process generates code using the optimized single issue multiple data approach (step 706) with the process terminating thereafter. The optimized single issue multiple data approach is further described in FIG. 4 and FIG. 5. If the process determines a scalar approach is most efficient in step 702, the process generates code using the scalar approach (step 704) with the process terminating thereafter.

Figure 8:
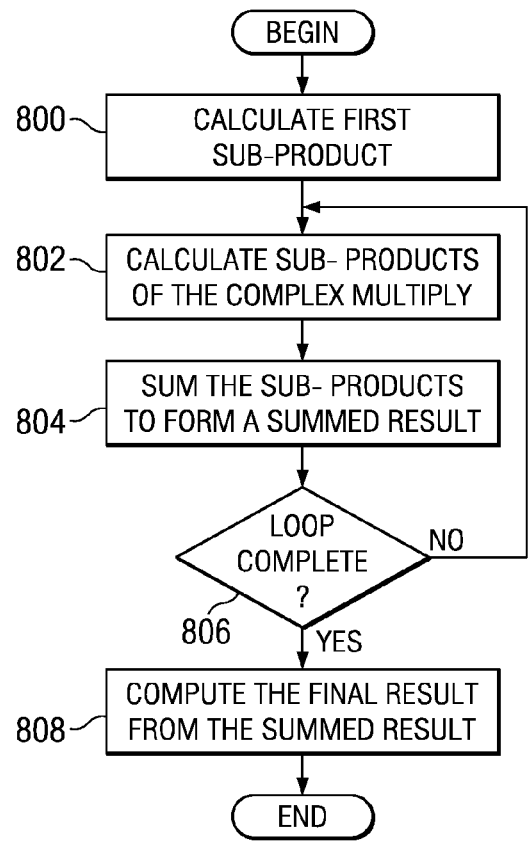
FIG. 8 is a flowchart for a process for performing complex reduction operations in accordance with the illustrative embodiments.

FIG. 8 is a flowchart for a process for performing complex reduction operations in accordance with the illustrative embodiments. The process in FIG. 8 is a more detailed explanation of step 706 in FIG. 7 and the process described by FIG. 5. The process in FIG. 8 may be performed by a compiler in a processor system, such as compiler 402 in processor system 400 in FIG. 4. The process begins by calculating a first sub-product (step 800). Next, the process calculates sub-products of a complex multiply (step 802). Next, the process sums the sub-products to form a summed result (step 804). The process then determines whether a loop is complete (step 806). The determination is made based on a factor or iteration of "n" that may be referred to as the cutoff. For example, the process may be required to loop n/2−2 times before the loop is determined to be complete in step 806. Inside the loop of steps 802, 804, and 806 sub-results are calculated and added to the previous sub-results to reduce the complex operation for more efficient computation. The determination of which approach to use in step 702 of FIG. 7 may be based on the iterations required to complete the complex operation.

If a determination is made that the loop is not complete, the process calculates sub-products of the complex multiply (step 802) and continues to step 804. If a determination is made that the loop is complete in step 806, the process computes the final result from the summed result (step 808) with the process terminating thereafter.

The complex reduction operation may be further summarized in two steps. First, pairs of complex numbers are retrieved, one from each input vector. Pairs are typically the first number of both input vectors, then the second number of both input vector, and so on. During the first step, a complex operation is performed on the pair to generate a single complex number per pair. In the illustrated example of FIG. 5, the operations are shown as a complex multiply.

Alternatively, the operation may be a complex divide, or any other similar operation. During the second step, the n sub-results computed during the first step are reduced to a single complex number. In this example, the reduction is shown as an addition, but the reduction may also be a subtraction or other similar operation. There is not a requirement that the first step be completed before starting the second step.

Thus, the illustrative embodiments provide a computer implemented method, apparatus, and computer usable program code for automatic code generation for complex arithmetic reduction for architecture lacking cross data-path support. The illustrative embodiments can significantly reduce the number of operations required to perform complex operations. As a result, complex operations may be performed must faster with less processing and memory requirements.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from at least one computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for compiling source code for performing a complex operation followed by a complex reduction operation to obtain a final result, the computer implemented method comprising:
    determining, by a compiler using an instruction calculation table, a number of operations that will be required by a target system to generate a final result for each of a traditional scalar method, a traditional single issue multiple data method, and an optimized single issue multiple data method;
    responsive to determining the number of operations, using the number of operations to select one of the traditional scalar method, the traditional single issue multiple data method, and the optimized single issue multiple data method for performing the complex operation and the complex reduction operation to obtain the final result;
    responsive to selecting the optimized single issue multiple data method, generating executable code for computing sub-products, reducing the sub-products to intermediate results, and summing the intermediate results to generate the final result.

2. The computer implemented method of claim 1, wherein the determining step is based on information describing whether alignment of data is known at compile time or runtime.

3. The computer implemented method of claim 1, wherein the determining step is based on a number of operations required to generate the final result.

4. The computer implemented method of claim 3, wherein the number of operations is specified by a cutoff.

5. The computer implemented method of claim 1, wherein the determining step is based on a target device executing the complex operation.

6. The computer implemented method of claim 1, wherein the complex operation is any of a complex multiply and a complex divide that are reduced by a complex addition or complex subtraction.

7. The computer implemented method of claim 1, wherein the sub-products represent a distributive expansion of the complex operation.

8. The computer implemented method of claim 1, wherein the sub-products are calculated and the intermediate results are reduced until a loop is complete.

9. A data processing system comprising:
a bus system;
a communications system connected to the bus system;
a memory connected to the bus system, wherein the memory includes a set of instructions; and
a processing unit connected to the bus system, wherein the processing unit executes the set of instructions to:
determine, by a compiler using an instruction calculation table, a number of operations that will be required by a target system to generate a final result for each of a traditional scalar method, a traditional single issue multiple data method, and an optimized single issue multiple data method;
responsive to determining the number of operations, using the number of operations to select one of the traditional scalar method, the traditional single issue multiple data method, and the optimized single issue multiple data method for performing a complex operation and a reduction operation to obtain a final result; and
responsive to selecting the optimized single issue multiple data method, generating computer-usable program code for computing sub-products, reducing the sub-products to intermediate results, and summing the intermediate results to generate the final result.

10. The system of claim 9, wherein the set of instructions is included in the compiler.

11. The system of claim 9, wherein the data processing system does not have cross data-path support.

12. The system of claim 9, wherein the computer-usable program code is executed on single issue multiple data units without cross data-path support within the processing unit.

13. A computer program product for compiling source code for performing a complex operation followed by a complex reduction operation, the computer program product comprising:
one or more non-transitory computer readable storage devices;
computer usable program code stored on at least one of the one or more non-transitory computer readable storage devices for determining, by a compiler using an instruction calculation table, a number of operations that will be required by a target system to generate a final result for each of a traditional scalar method, a traditional single issue multiple data method, and an optimized single issue multiple data method;
computer usable program code stored on at least one of the one or more non-transitory computer readable storage devices for responsive to determining the number of operations, using the number of operations to select one of the traditional scalar method, the traditional single issue multiple data method, and the optimized single issue multiple data method for generating executable code for performing the complex operation and the complex reduction operation to obtain a final result; and
computer usable program code stored on at least one of the one or more non-transitory computer readable storage mediums, responsive to selecting the optimized single issue multiple data method for generating executable code for computing sub-products, reducing the sub-products to intermediate results, and summing the intermediate results to generate the final result.

14. The computer program product of claim 13, wherein the executable code for computing sub-products, reducing the sub-products to intermediate results, and summing the intermediate results to generate a final result includes executable code for looping a number of times until the sub-products are calculated and the intermediate results are reduced.

15. The computer program product of claim 13, wherein the sub-products represent a distributive expansion of the complex operation.

* * * * *